United States Patent
Filipov (10) Patent No.: US 9,210,233 B2
(45) Date of Patent: Dec. 8, 2015

(54) SYSTEM FOR SENDING INTERNET BASED CONTENT TO A MEDIA DEVICE THROUGH A MOBILE PHONE

(75) Inventor: Metodi Filipov, West Islip, NY (US)

(73) Assignee: FLIPPS MEDIA AD (BG)

( * ) Notice: Subject to any disclaimer, the term of this patent is extended or adjusted under 35 U.S.C. 154(b) by 42 days.

(21) Appl. No.: 12/693,707

(22) Filed: Jan. 26, 2010

(65) Prior Publication Data

US 2011/0183656 A1 Jul. 28, 2011

(51) Int. Cl.
*H04L 29/06* (2006.01)
*H04L 29/08* (2006.01)
*H04W 88/04* (2009.01)

(52) U.S. Cl.
CPC ............ *H04L 67/2814* (2013.01); *H04L 67/04* (2013.01); *H04W 88/04* (2013.01)

(58) Field of Classification Search
CPC .... H04L 67/04; H04L 67/2814; H04W 88/04
USPC ........ 455/414.3, 418–420, 466, 550.1, 552.1, 455/553.1; 709/218, 229
See application file for complete search history.

(56) References Cited

U.S. PATENT DOCUMENTS

| | | | | |
|---|---|---|---|---|
| 2007/0005727 A1* | 1/2007 | Edwards et al. | ............... | 709/218 |
| 2007/0078993 A1* | 4/2007 | Issa | ............... | 709/229 |
| 2008/0071630 A1* | 3/2008 | Donahue | ......................... | 705/26 |
| 2008/0275960 A1* | 11/2008 | Myllyla et al. | ................ | 709/217 |
| 2010/0169778 A1* | 7/2010 | Mundy et al. | ................. | 715/716 |

\* cited by examiner

*Primary Examiner* — Steve D Agosta (74) *Attorney, Agent, or Firm* — Moritt Hock & Hamroff LLP; Steven S. Rubin, Esq.

(57) ABSTRACT

A method for sending content to a media device. The method comprises receiving a request by a mobile phone for content, the mobile phone including an antenna effective to communicate with a base station or a satellite. The method comprises sending the request from the mobile phone over the Internet to a content server. The request further comprises receiving the request at the content server; sending the request to a memory; receiving the content from the memory and sending the content from the content server to the mobile phone. The method further comprises receiving the content from the content server at the mobile phone; sending at least some of the content from the mobile phone to a media device; receiving the at least some of the content at the media device; and outputting the content on the media device.

10 Claims, 6 Drawing Sheets

SYSTEM FOR SENDING INTERNET BASED CONTENT TO A MEDIA DEVICE THROUGH A MOBILE PHONE

BACKGROUND OF THE INVENTION

1. Field of the Invention

This disclosure relates to a system and method for enabling content to be sent from the Internet, through a mobile phone to a media device.

2. Description of the Related Art

Figure 1:
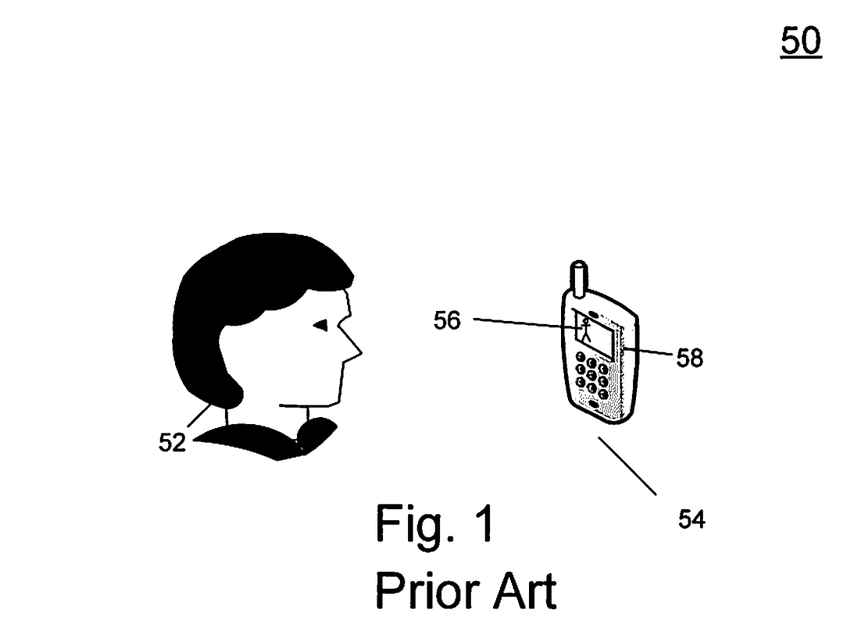
FIG. 1 is a system drawing of a system in accordance with the prior art.

Referring to FIG. 1, there is shown a prior art system 50 effective to display images. In system 50, a user 52 may use a mobile phone 54 for a variety of applications including both voice and data communications. As mobile phones have evolved to include more applications and data storage, most current phones can display images 56 on a display 58. This disclosure describes improvements over these prior art systems.

SUMMARY OF THE INVENTION

One embodiment of the invention is a method for sending content to a media device. The method comprises receiving a request by a mobile phone for content, the mobile phone including an antenna effective to communicate with a base station or a satellite. The method further comprises sending the request from the mobile phone over the Internet to a content server; receiving the content from the content server at the mobile phone; and sending at least some of the content from the mobile phone to a media device.

Another embodiment of the invention is a mobile phone effective to send content to a media device. The mobile phone comprises a processor; and an antenna in communication with the processor, the antenna effective to communicate with a base station or a satellite; and a memory in communication with the processor. The processor is effective to receive a request for content; send the request from the mobile phone over the Internet to a content server; receive the content from the content server; and send at least some of the content from the mobile phone to a media device.

Yet another embodiment of the invention is a method for sending content to a media device. The method comprises receiving a request by a mobile phone for content, the mobile phone including an antenna effective to communicate with a base station or a satellite. The method further comprises sending the request from the mobile phone over the Internet to a content server; receiving the request at the content server; and sending the request from the content server to a memory. The method further comprises receiving the content from the memory at the content server; sending the content from the content server to the mobile phone; and receiving the content from the content server at the mobile phone. The method further comprises sending at least some of the content from the mobile phone to a media device; receiving the at least some of the content at the media device; and outputting the content on the media device.

Still yet another embodiment of the invention is a system for sending content to a media device. The system comprises a mobile phone; a content server in communication with the mobile phone; and a mobile device in communication with the mobile phone. The mobile phone includes a processor; an antenna in communication with the processor, the antenna effective to communicate with a base station or a satellite; and a memory in communication with the processor. The processor is effective to receive a request for content; send the request from the mobile phone over the Internet to the content server; the content server including a memory in communication with the content server. The content server is effective to receive the request; send the request to the memory; receive the content from the memory; and send the content to the mobile phone. The processor is further effective to receive the content from the content server; send at least some of the content from the mobile phone to the media device. The media device effective to receive the at least some of the content; and output the at least some of the content.

Yet another embodiment of the invention is a computer storage medium having computer-executable instructions stored thereon which, when executed by a computing device, adapt the computing device to perform a method for sending content to a media device. The method comprises receiving a request by a mobile phone for content, the mobile phone including an antenna effective to communicate with a base station or a satellite. The method further comprises sending the request from the mobile phone over the Internet to a content server; receiving the content from the content server at the mobile phone; and sending at least some of the content from the mobile phone to a media device.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Figure 2:
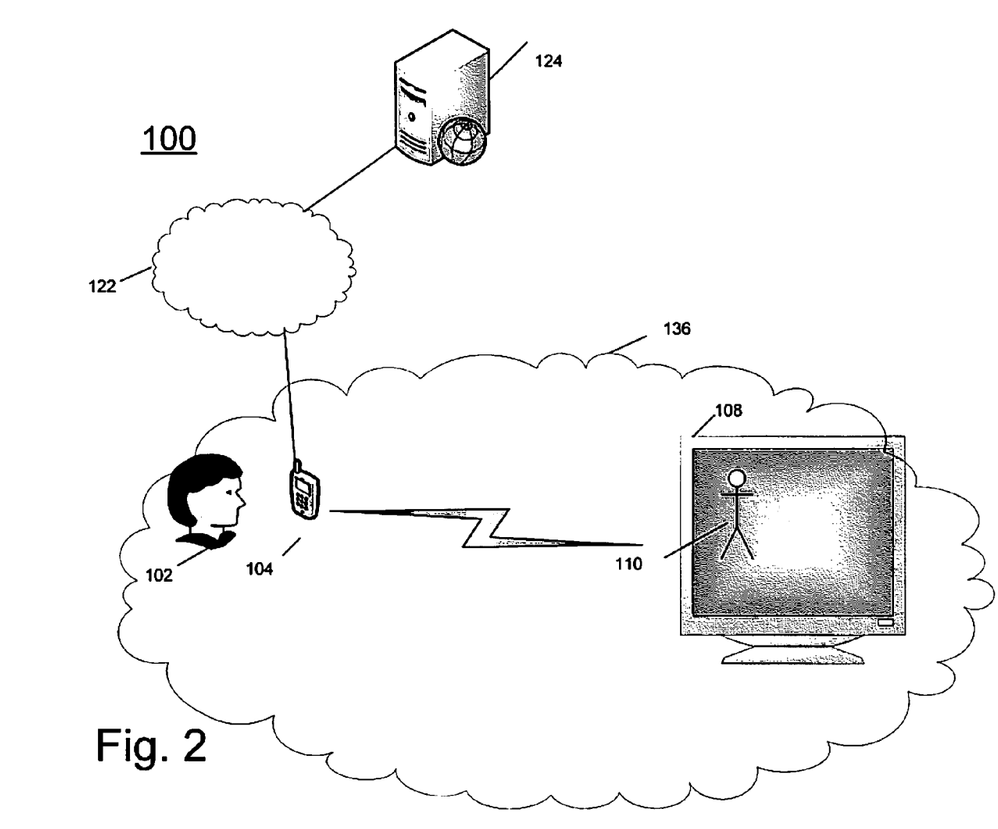
FIG. 2 is a system drawing of a system in accordance with an embodiment of the invention.

Referring to FIG. 2, there is shown a system 100 in accordance with an embodiment of the invention. As discussed in more detail below, in system 100, a user 102 may use a mobile device phone 104 to request output of content 110. The request may be sent over a network 122 to a content server 124. In response to the request, content server 124 sends content 110 to mobile phone 104. Phone 104 may then send content 110 over another network 136 to be output from a media device 108. Content 110 could be, for example, a combination of files including an image, a series of images, video, audio, etc.

Figure 3:
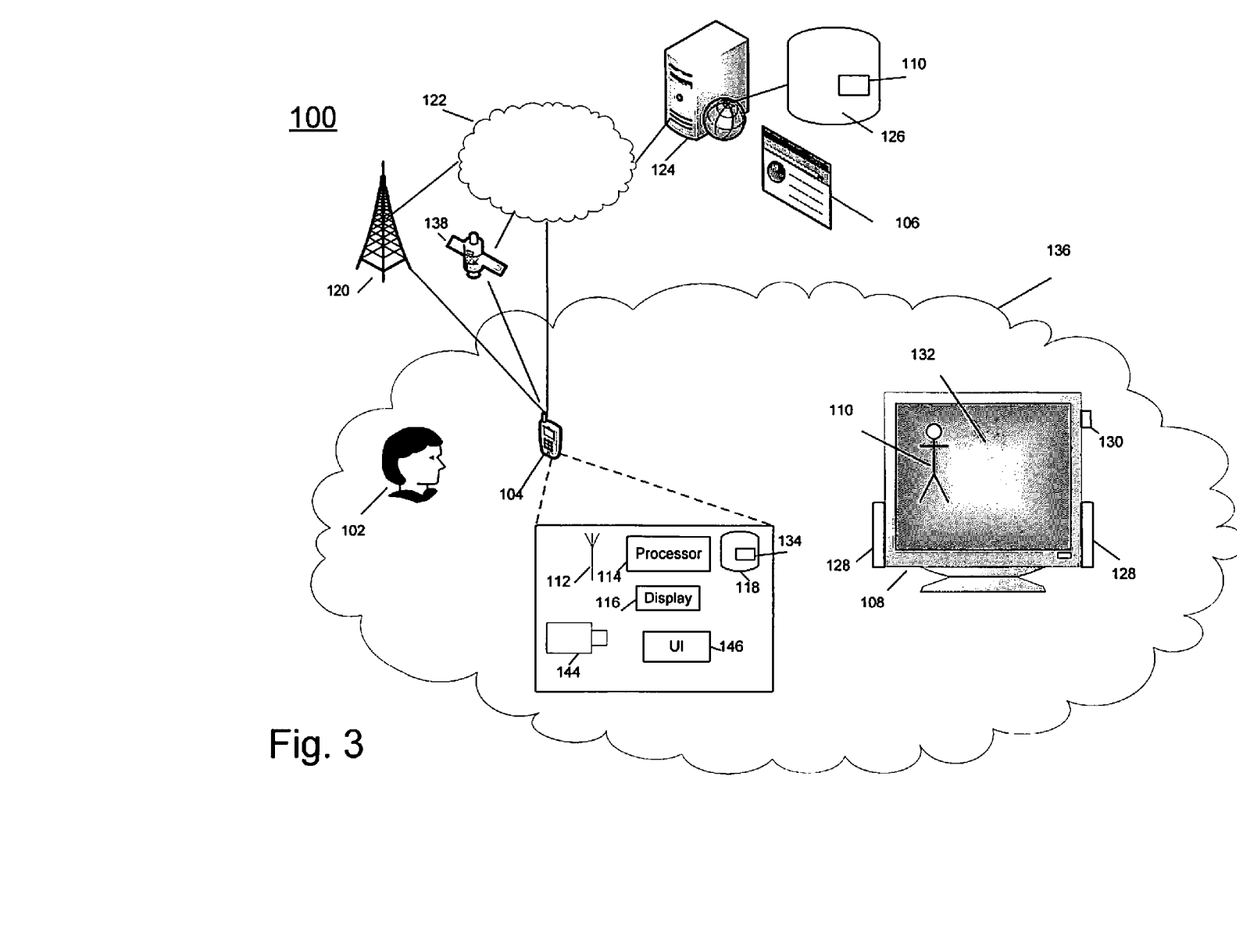
FIG. 3 is a system drawing of a system in accordance with an embodiment of the invention.

Referring to FIG. 3, there is shown more detail of system 100. Mobile phone 104 may be in communication with media device 108 through network 136. Network 110 may be, for example, a wireless network such as a home wireless network. Media device 108 may be, for example, a television, a monitor, a computer, a gaming console such as the XBOX 360, SONY PLAYSTATION, NINTENDO WII, NINTENDO DS, PSP, a dedicated media player like POPCORN HOUR, etc. Media device 108 may include a network port 130, such as an Ethernet port, or a UPnP (Universal Plug and Play) or DLNA (Digital Living Network Alliance) port. Media device 108 may output content through, for example, a display 132, speakers 128 or a combination thereof.

Mobile phone 104 may be in communication with network 122, such as the Internet, either directly or through a cellular base station 120 or satellite 138 or through network 136. Network 122, in turn, is in communication with content server 124. Content server 124 is in communication with a memory 126 that may store content 110. Content 110 may be, for example, content stored in connection with certain web sites and/or that may be displayable on a web page 106. Examples of web pages 106 with content 110 could include, for example, social networking web pages on FACEBOOK, FLICKR, MYSPACE, PICASA, LINKED-IN, etc.

Mobile phone 104 may include an antenna 112, a display 116, a memory 118, a user interface 146 and a camera 144 all in communication with a processor 114. Antenna 112 may enable wireless communications with media device 108, base station 120, satellite 138 and network 122. Memory 118 may store an application 134 that may be used to request access to content 110 stored in memory 126 of content server 124. For example, application 134 may communicate with a particular API (application programming interface) related to content server 124 and/or web site 106.

Figure 4:
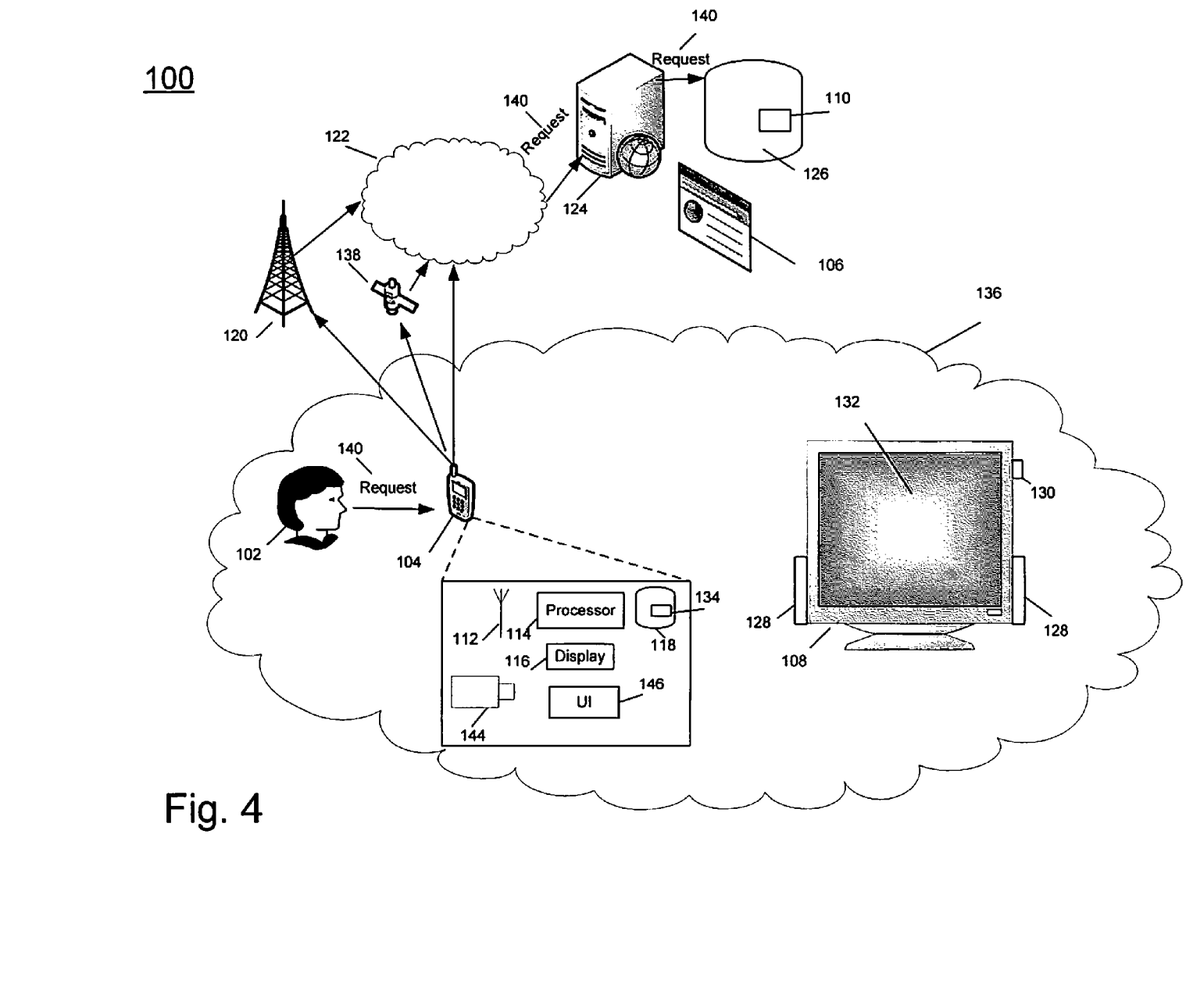
FIG. 4 is a system drawing of a system in accordance with an embodiment of the invention.

Referring to FIG. 4, in use, mobile phone 104 may receive a request 140 from a user 102 on user interface 146 requesting content 110. Request 140 may initiate application 134 and may include an identification of content server 124 and credentials. For example, request 140 may indicate that user 102 desires content 110 from his/her FACEBOOK account and may include credentials including a user name and password for the account. Phone 104 sends request 140 to content server 124 through network 122 either directly or through base station 120 or satellite 138 or through network 136. Content server 124 receives request 140 and sends request 140 to memory 126.

Figure 5:
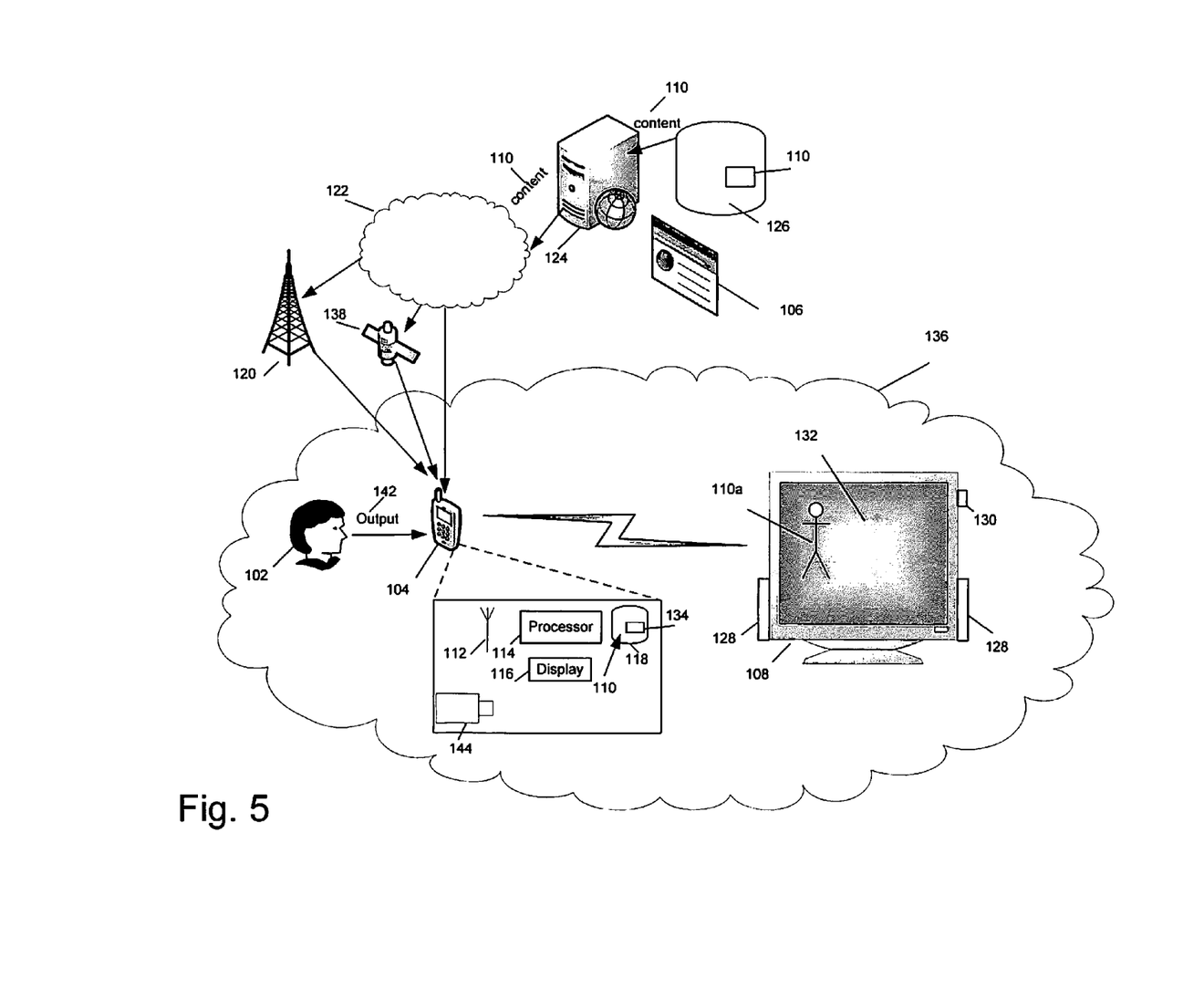
FIG. 5 is a system drawing of a system in accordance with an embodiment of the invention.

Referring now to FIG. 5, in response to request 140, memory 126 provides content 110 to content server 124. Content server 124 may send content 110 to mobile phone 104 through network 122 and base station 120 or satellite 138 or through network 136. Content 110 may be stored in memory 118 of phone 104. Phone 104 now awaits for an output request 142 by user 102. A catalog of content 110 may be generated by processor 114 and displayed to user 102 on display 116. Output request 142 may be for a subset of content 110 in request 140. Request 140 may request all pictures from a particular Internet account whereas output request 142 may request output of only certain of the pictures in request 140. Output request 142 may also request output of content stored directly on phone 104, such as content stored by camera 144. Such content may also be sent to media device 108. Media device 108 receives and outputs content 110a, such as through display 132, speakers 128 or some combination thereof. Content 110a may be all of, or a selected subset of, content 110.

Upon receipt of output request 142 from user 102 on user interface 146, phone 104 may first broadcast information about phone 104 in network 136 such as through, for example, SSDP (simple service discovery protocol) or UPnP/DLNA communications. Such a broadcast helps ensure communication between phone 104 and media device 108. Mobile device 194 may then send content 110 to media device 108 over network 136 such as through, for example, UPnP/DLNA communications.

Application 134 may transform content 110 so that content 110 is in a format more commonly used by media devices 108. For example, processor 114 may read content 110 and meta data of content 110 may be processed to identify the codecs (and their parameters) in use. Thereafter, content 110 may be decoded using a decoder to determine the original format of the content. This decoding basically fetches the image, video, or audio information in "raw", unencoded format. The decoded data may be encoded again to a new format supported by media device 108. Content 110 could be either encoded and decoded on the fly (sometimes called on-demand transcoding) or content 110 could be preprocessed and stored in memory 118 in its new format before streaming. For example, application 134 may transform pictures in content 110 into a JPEG (joint pictures experts group) or PNG (portable network graphics) format.

Application 134 may be disabled by user 102 so that content 110 is not sent to media device 108. This operation may be useful in public network situations to avoid undesired distribution of private information. As mentioned above, output request 142 may cause phone 104 to send content 110 to media device 108. This may include making content 110 available for request by media device 108 including UPnP/DLNA port 130.

A system in accordance with this disclosure enables a mobile phone to be used as a media proxy for content stored on the Internet. As content 110 is sent from the Internet and stored locally on the mobile device, output of content 110 on media device 108 may be performed quickly. Content may be stored and outputted simultaneously from phone 104, and/or from a plurality of Internet based memories.

Figure 6:
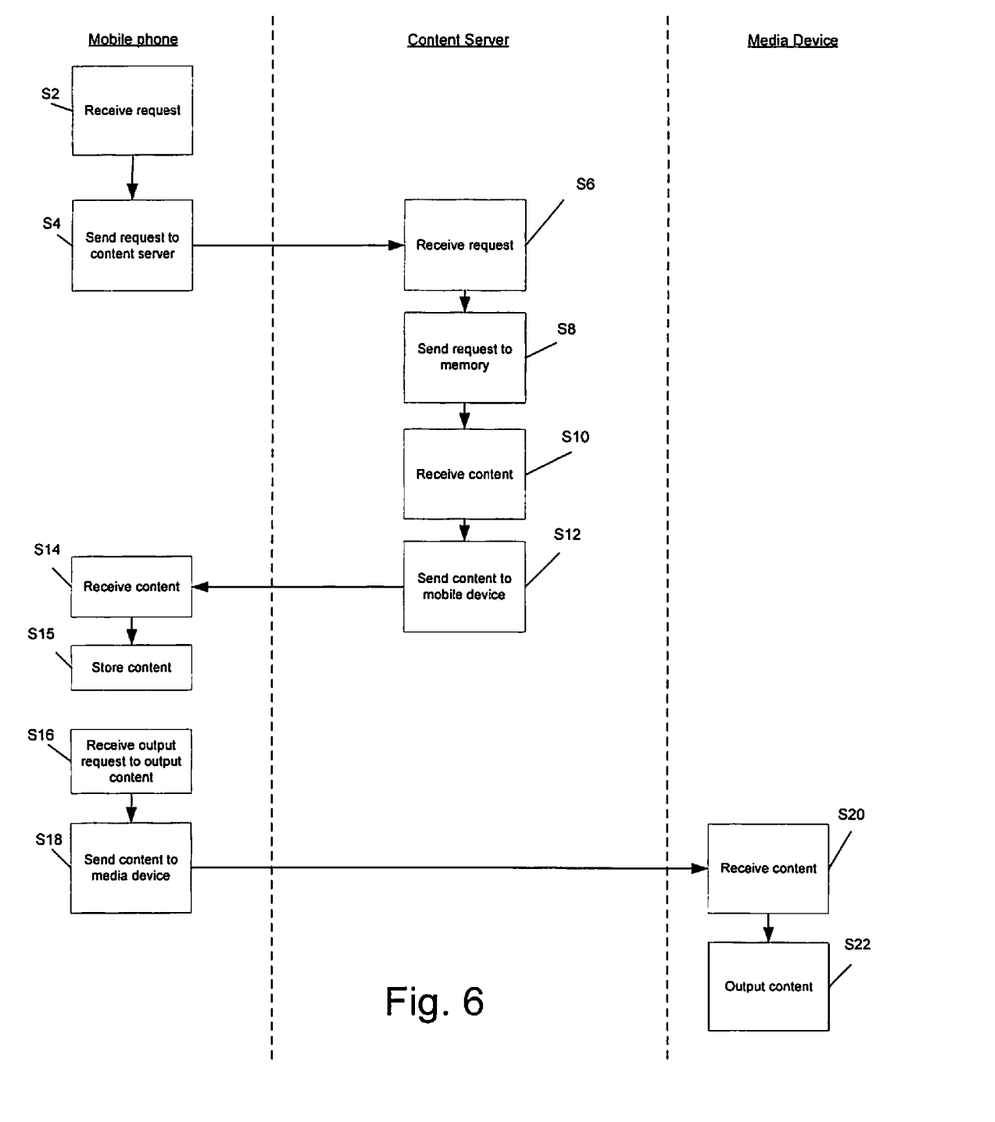
FIG. 6 is a flow chart illustrating a process in accordance with an embodiment of the invention.

Referring to FIG. 6, there is shown a process which could be performed in accordance with the disclosure. The process of FIG. 6 could be implemented using, for example, system 100 discussed above. As shown, at a step S2, a mobile phone may receive a request to display content. Such content may be stored by a content server connected to the Internet. The request may include a particular web site and credentials for the site.

At step S4, the mobile phone may send the request to the content server. At step S6, the content server may receive the request. At step S8, the content server may send the request to a memory. At step S10, the content server may receive the content from the memory. At step S12, the content server may send the content to the mobile phone. At step S14, the mobile phone may receive the content. At step S15, the mobile phone may store the content.

At step S16, the mobile phone may receive an output request to output the content. At step S18, the mobile phone may send the content to the media device. This could be performed wirelessly and could be in response to a request from the media device. At step S20, the media device may receive the content. At step S22, the media device may output the content such as through a visual display, speakers, or some combination.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A method for sending content to a media device, the method comprising:
   receiving a request by a mobile phone, the request being in a format effective to request for content available at a web page, the content being a video file displayable on the web page and encoded in a first transport protocol that allows the content to be displayable on the web page and not interpretable by the media device, wherein the media device is compatible with one or more home networking protocols, where the request is for the content to be displayed on the media device that can interpret the content encoded in a second transport protocol different from the first transport protocol, the request being generated by an application programming interface, the application programming interface relating to the web page, the mobile phone including an antenna effective to communicate with a base station, a network, or a satellite;
   sending the request from the mobile phone over the Internet to the web page using the application programming interface, the request including an identification of the web page and credentials relating to the content on the web page;
   receiving a response to the request from the web page;
   generating a catalog, based on the response, of the content available from the web page at the mobile phone;
   displaying the catalog on a first display of the mobile phone;
   receiving an output request by the mobile phone, the output request requesting a subset of the content from the web page, the subset being less than all of the content;
   identifying codecs and parameters of the codecs based on the subset of the content and meta data of the subset of the content; and
   sending the subset of the content from the web page through the mobile phone to the media device to be displayed on the media device, where the subset of the content from the web page is encoded in the second transport protocol, wherein the subset is selected based on the catalog and wherein the mobile phone transforms the first transport protocol for the subset of the content to the second transport protocol, so that the content is interpretable by the media device, wherein the media device includes a second display effective to output the content, wherein the mobile phone includes an option to selectively disable sending the subset of the content from the web page through the mobile phone to the media device.

2. The method as recited in claim 1, wherein sending the content to the media device is performed over a wireless network.

3. A mobile phone effective to send content to a media device, the mobile phone comprising:
   a processor;
   an antenna in communication with the processor, the antenna effective to communicate with a base station, a network, or a satellite;
   a memory in communication with the processor; and
   a first display in communication with the processor;
   the processor effective to
   receive a request for content, the request being in a format effective to request for content available at a web page, the content being a video file displayable on the web page and encoded in a first transport protocol that allows the content to be displayable on the web page and not interpretable by the media device, wherein the media device is compatible with one or more home networking protocols, where the request is for the content to be displayed on the media device that can interpret the content encoded in a second transport protocol different from the first transport protocol, the request being generated by an application programming interface, the application programming interface relating to the web page;
   send the request from the mobile phone over the Internet to the web page through the application programming interface, wherein the request includes an identification of the web page and credentials relating to the content on the web page;
   receive a response to the request from the web page;
   generate a catalog, based on the response, of the content available from the web page;
   display the catalog on the first display of the mobile phone;
   receive an output request, the output request requesting a subset of the content from the web page, the subset being less than all of the content;
   identify codecs and parameters of the codecs based on the subset of the content and meta data of the subset of the content; and
   send the subset of the content from the web page through the mobile phone to the media device in the second transport protocol, wherein the subset of the content is selected based on the catalog and wherein the mobile phone transforms the first transport protocol for the subset of the content to the second transport protocol, so that the content is interpretable by the media device, wherein the media device includes a second display effective to output the content, wherein the mobile phone includes an option to selectively disable sending the subset of the content from the web page through the mobile phone to the media device.

4. The phone as recited in claim 3, wherein the content further includes at least one of an image file or an audio file.

5. The phone as recited in claim 3, wherein the processor is effective to send the content to the media device over a wireless network.

6. A method for sending content to a media device, the method comprising:
   receiving a request by a mobile phone, the request being in a format effective to request for content available at a web page, the content being a video file displayable on the web page and encoded in a first transport protocol that allows the content to be displayable on the web page and not interpretable by the media device, wherein the media device is compatible with one or more home networking protocols, where the request is for the content to be displayed on the media device that can interpret the content encoded in a second transport protocol different from the first transport protocol, the request being generated by an application programming interface, the application programming interface relating to the web page, the mobile phone including an antenna effective to communicate with a base station, a network, or a satellite;
   sending the request from the mobile phone over the Internet to the web page using the application programming interface, the request including an identification of the web page and credentials relating to the content on the web page;
   receiving the request at the web page;

sending a response to the request from the web page to the mobile phone;
sending the request from the web page to a memory;
receiving the content from the memory at the web page;
generating a catalog, based on the response, of the content available from the web page to the mobile phone;
displaying the catalog on a first display of the mobile phone;
receiving an output request by the mobile phone, the output request requesting a subset of the content from the web page, the subset being less than all of the content;
identifying codecs and parameters of the codecs based on the subset of the content and meta data of the subset of the content; and
sending the subset of the content from the web page through the mobile phone to the media device in the second transport protocol, wherein the subset is selected based on the catalog and wherein the mobile phone transforms the first transport protocol for the subset of the content to the second transport protocol, so that the content is interpretable by the media device, wherein the media device includes a second display effective to output the content, wherein the mobile phone includes an option to selectively disable sending the subset of the content from the web page through the mobile phone to the media device;
receiving the subset of the content at the media device; and
outputting the subset of the content on the display of the media device.

7. A system for sending content to a media device, the system comprising:
a mobile phone;
a content server configured to store content displayable on a web page, and in communication with the mobile phone;
a media device in communication with the mobile phone, wherein the media device includes a first display;
the mobile phone including:
a processor;
a second display in communication with the processor;
an antenna in communication with the processor, the antenna effective to communicate with a base station, a network, or a satellite; and
a memory in communication with the processor;
the processor effective to
receive a request for content, the request being in a format effective to request for content available at the web page, the content being a video file displayable on the web page and encoded in a first transport protocol that allows the content to be displayable on the web page and not interpretable by the media device, wherein the media device is compatible with one or more home networking protocols, where the request is for the content to be displayed on the media device that can interpret the content encoded in a second transport protocol different from the first transport protocol, the request being generated by an application programming interface, the application programming interface relating to the web page;
send the request from the mobile phone over the Internet to the web page through the application programming interface, wherein the request includes an identification of the web page and credentials relating to the content on the web page;
the content server including a memory in communication with the web page;
the web page effective to
receive the request;
send a response to the request to the mobile phone;
send the request to the memory;
receive the content from the memory; and
send the content to the mobile phone;
the processor further effective to
receive the content from the web page;
generate a catalog of the content, based on the response;
display the catalog on the second display;
receive an output request, the output request requesting a subset of the content from the web page, the subset being less than all of the content;
identify codecs and parameters of the codecs based on the subset of the content and meta data of the subset of the content; and
send the subset of the content from the content server through the mobile phone to the media device in the second transport protocol, wherein the subset is selected based on the catalog and wherein the mobile phone transforms the first transport protocol for the subset of the content to the second transport protocol, so that the content is interpretable by the media device, wherein the mobile phone includes an option to selectively disable sending the subset of the content from the web page through the mobile phone to the media device;
the media device effective to
receive the subset of the content; and
output the subset of the content on the first display.

8. The system as recited in claim 7, wherein the content further includes at least one of an image file or an audio file.

9. The system as recited in claim 7, wherein the processor is effective to send the content to the media device over a wireless network.

10. A non-transitory computer storage medium having computer-executable instructions stored thereon which, when executed by a computing device, adapt the computing device to perform a method for sending content to a media device, the method comprising:
receiving a request by a mobile phone, the request being in a format effective to request for content available at a web page, the content being a video file displayable on the web page and encoded in a first transport protocol that allows the content to be displayable on a web page and not interpretable by the media device, wherein the media device is compatible with one or more home networking protocols, where the request is for the content to be displayed on the media device that can interpret the content encoded in a second transport protocol different from the first transport protocol, the request being generated by an application programming interface, the application programming interface relating to the web page, the mobile phone including an antenna effective to communicate with a base station, a network, or a satellite;
sending the request from the mobile phone over the Internet to the web page using the application programming interface, the request including an identification of the web page and credentials relating to the content on the web page;
receiving a response to the request from the web page;
generating a catalog, based on the response, of the content available from the web page at the mobile phone;
displaying the catalog on a first display of the mobile phone;

receiving an output request by the mobile phone, the output request requesting a subset of the content from the web page, the subset being less than all of the content;

identifying codecs and parameters of the codecs based on the subset of the content and meta data of the subset of the content; and sending the subset of the content from the web page through the mobile phone to the media device in the second transport protocol, wherein the subset is selected based on the catalog and wherein the mobile phone transforms the first transport protocol for the subset of the content to the second transport protocol, so that the content is interpretable by the media device, wherein the media device includes a second display effective to output the content, wherein the mobile phone includes an option to selectively disable sending the subset of the content from the web page through the mobile phone to the media device.

\* \* \* \* \*